United States Patent
Kikuchi

(10) Patent No.: US 9,133,879 B2
(45) Date of Patent: Sep. 15, 2015

(54) TURNING BEARING WITH ROLLERS BETWEEN OUTER RING AND INNER RING

(71) Applicant: NIPPON THOMPSON CO., LTD., Tokyo (JP)

(72) Inventor: Shunsuke Kikuchi, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 226 days.

(21) Appl. No.: 13/760,656

(22) Filed: Feb. 6, 2013

(65) Prior Publication Data

US 2013/0202240 A1 Aug. 8, 2013

(30) Foreign Application Priority Data

Feb. 6, 2012 (JP) .................................. 2012-022909

(51) Int. Cl.
| | |
|---|---|
| *F16C 43/04* | (2006.01) |
| *F16C 33/58* | (2006.01) |
| *F16C 43/06* | (2006.01) |
| *F16C 19/38* | (2006.01) |
| *F16C 33/37* | (2006.01) |

(52) U.S. Cl.
CPC ............... *F16C 33/585* (2013.01); *F16C 19/38* (2013.01); *F16C 33/3706* (2013.01); *F16C 43/06* (2013.01); *F16C 2240/40* (2013.01); *F16C 2300/02* (2013.01)

(58) Field of Classification Search
CPC .... F16C 19/225; F16C 19/38; F16C 33/3706; F16C 33/585; F16C 2240/40; F16C 2300/02; F16C 43/06
USPC ............ 384/613, 564, 447, 47, 569, 621, 622
See application file for complete search history.

(56) References Cited

FOREIGN PATENT DOCUMENTS

| JP | 2000314418 A | 11/2000 | |
|---|---|---|---|
| JP | 2002013540 A | 1/2002 | |
| WO | 2009020087 A1 | 2/2009 | |
| WO | WO 2012126529 * | 9/2012 | ............. F16C 19/38 |

* cited by examiner

*Primary Examiner* — Richard W Ridley
*Assistant Examiner* — Yamilka Pinero Medina
(74) *Attorney, Agent, or Firm* — Browdy and Neimark, PLLC

(57) ABSTRACT

An effective contact length in race surfaces formed on grooved races cut in an outer ring and an inner ring is made as greater as permitted to improve the load-carrying capacity, and correspondingly guide parts born against axially opposite ends of a roller are made as less as possible in width to reduce frictional contact resistance applied to the axially opposite ends of the roller, thereby preventing a skew of the roller. An inside circular surface on the outer ring is staggered or different in level on opposite sides of a outside grooved race to make greater the race surface than an effective contact length of circular rolling surfaces of the rollers and correspondingly less the guide part in width than the race surface.

6 Claims, 10 Drawing Sheets

TURNING BEARING WITH ROLLERS BETWEEN OUTER RING AND INNER RING

FIELD OF THE INVENTION

The present invention relates to a turning bearing or swivel bearing with rollers lying between an outer ring and an inner ring suitable for use in a turning or pivotal component installed in, for example semiconductor fabricating equipment, precision machines, measurement/inspection instruments, medical equipment, a variety of industrial robots, assembling machines, conveyors machine tools, micromachines, and the like.

BACKGROUND OF THE INVENTION

An international publication No. WO 2009/020087 discloses an example of the double-row roller bearing, which is composed of an outer ring whose inside circular surface has two rows of outside grooved tracks, or races, extending circumferentially of the outer ring, an inner ring whose inside circular surface has two rows of inside grooved races extending circumferentially of the inner ring in opposition to the outside grooved races of the outer ring to define raceways between the outside grooved races and inside grooved races, and a plurality of rollers lying in the raceways so as to circulate through the raceways with carrying loads as the inner ring and the outer ring rotate relative to each other. With the outside and inside grooved races, the race surfaces on which the rollers roll through intersect with skew regulator surfaces to form a substantially V-shape in a transverse cross-section. The skew regulator surfaces face to axially opposite ends of the rollers with leaving minute clearances between them. On the skew regulator surfaces on the outside grooved races, moreover, there are each provided a circular ridge flanked by annular recesses extending circumferentially of the inside circular surface of the outer ring, the circular ridge lying in opposition to a rotation axis of the roller. On the skew regulator surfaces on the inside grooved races, there are each provided a circular ridge flanked by annular recesses extending circumferentially of the outside circular surface of the inner ring, the circular ridge lying in opposition to a rotating axis of the roller. Furthermore, the outer ring has passages extending radially from the floors of the outside grooved races to release lubricant.

Of some commonly-assigned Japanese patent applications concerned with roller bearings, the commonly-assigned Japanese Laid-Open Patent Application 2000-314 418 discloses an angular-contact roller bearing constructed as shown in FIGS. 15 and 16 to make assemblage as well as downsizing easier. With the prior angular-contact roller bearing as shown in FIG. 15, two rows of raceways 60 are formed between an outer ring 51 and an inner ring 52, and the rollers 53 are disposed in the raceways 60 in such a fashion that their rotation axes are tilted or askew with respect to a rotating shaft to support the outer ring 51 and the inner ring 52 for rotation. The outer ring 51 has a loading hole 55 to charge the rollers 53 into the raceways 60 through there. The loading hole 55 is closed with a plug 67 after the completion of introduction of the rollers 53 into the raceways 60. With an inside circular surface 58 of the outer ring 51, there is no difference or gap in level on opposite sides of the outside grooved race 56. With an outside circular surface 59 of the inner ring 52 as well, there is no difference or gap in level on opposite sides of the inside grooved race 57. Both the outside grooved race 56 and the inside grooved race 57 have a V-shape in a transverse cross-section, whose one sides are race surfaces 63 and 65 coming into rolling contact with the circular rolling surfaces 61 of the rollers 53 and whose the other sides are guide surfaces 64 and 66 born against the axially opposite ends 62 of the rollers 53. The race surfaces 63 and 65 and the guide surfaces 64 and 66 are made identical in configuration with each other. The angular-contact roller bearing constructed as stated earlier, moreover, has separators 54 each of which is interposed between any adjacent rollers 53 lying between the grooved races 56 and 57 (refer to FIG. 16). The separator 54 as shown in FIG. 16 includes an upper surface 68 and lower surface 69 lying in opposition to race surfaces 63 and 68 of the races, along which the rollers 53 roll through, with leaving slight clearances to keep the upper and lower surfaces 68, 69 apart from the race surfaces 63 and 68, a major column 70 joining the upper and lower surfaces 68 and 69 together, and edge surfaces lying in opposition to guide surfaces of the races, against which the axially opposite ends 62 of the rollers 53 are opposed, with leaving slight clearances to keep the edge surfaces apart from the guide surfaces. The separator 54 has leading and trailing major sides concaved in symmetry with each other to fit over the rollers 53. Moreover, the concaved surfaces on the major sides are contoured in arced or curved profiles that the concaved sides bulge or rise gradually as their concavities get closer towards the centers thereof, so that the rollers 53 are guided while turning, with coming into touch with only the bulged centers in the concaved sides of the separator 54.

Another prior double-row turning bearing as shown in FIG. 17 is described in Japanese Laid-Open Patent Application No. 2002-13 540, in which a plurality of rolling elements of rollers 73 is installed in double rows of raceways 74 defined between an outer ring 71 and an inner ring 72. Especially, the prior double-row turning bearing is composed of the outer ring 71 having an inside circular surface on which double rows of grooved races 75 are formed to extend circumferentially of the inside circular surface, the inner ring 72 placed inside the outer ring 71 and having an outside circular surface on which double rows of grooved races 76 are formed to oppose circumferentially to the grooved races 75 on the outer ring 71, and a plurality of rolling elements 73 installed in double rows of the raceways 74 defined between the grooved races on the outer ring and the inner ring. Either of the outer ring 71 and the inner ring 72 has a loading hole 77 on each raceway 74, which extends radially of the ring to make it possible to charge the rolling elements 73 into the raceway 74.

Meanwhile, with the prior double-row roller bearing, there have been made a relief side at a location where the race surface and the guide part for the axially opposite ends of the roller merge or meet with each other in the grooved race. The relief side usually has a width necessary to precisely finish the race surface and the guide surface into the desired profiles. With the prior double-row roller bearing, moreover, there is no difference in level across the overall width of the bearing in both the outside circular surface on the inner ring and the inside circular surface on the outer ring. Thus, for the foregoing constructional reasons, the circumferential grooves are made on widthwise opposite sides of the bearing to form the skew regulator surfaces for the provision of the guide parts born against the axially opposite ends of the roller. On grinding work to cut the grooved races, abrasive grains broken up from the grinding wheel are released towards the relief sides. Even though the cutting edge of the grinding wheel becomes the slightly dull or loaded surface out of the desired profile, there is left no debris on the race surfaces of the grooved races and therefore, the grooved races are made precisely in the desired profile thanks to the relief sides. With the conventional double-row roller bearings, since the relief sides are made not only in the guide surfaces but also in the race surfaces, the effective contact length on the race surfaces of the outer ring and the inner ring are made less compared with the effective contact length on the circular rolling surface of the roller. Thus, it remains a major challenge that the prior double-row roller bearing is lowered in the load-carrying capacity. Moreover, the guide surface in the inner ring is made to come into a sliding contact with the axially opposite ends of the roller across the overall widthwise dimension in the diametral direction of the axially opposite ends of the roller. As a result, the guide surface in the prior double-row roller bearing poses a serious problem in which the contact area in the axially opposite ends of the roller becomes large and therefore causes big frictional resistance.

SUMMARY OF THE INVENTION

The present invention has as its principal object to overcome the challenges stated earlier. The present invention provides a turning bearing comprising, an outer ring and an inner ring having two rows of grooved races, respectively, a plurality of rollers lying in raceways defined between the grooved races to circulate through the raceways while bearing loads as the outer ring and the inner ring rotate relative to each other and a plurality of separators lying in the raceways in an arrangement interposed between the rollers adjoining each other, the two rows of the grooved races each having a V-shape in a transverse cross-section, one side of the V-shape being a race surface coming into rolling contact with a circular rolling surface of the roller and the other side of the V-shape being a guide part born against axially opposite ends of the roller, and the guide part being constituted with a guide surface born against one of the axially opposite ends of the roller and a relief side for a grinding wheel in machining process, and an inside circular surface on the outer ring being staggered or different in level in widthwise direction of the rings on opposite sides of the grooved race, thereby making greater the race surface than an effective contact length of the circular rolling surfaces of the rollers to ensure the maximum load rating or load-carrying capacity and correspondingly making the guide part born against the axially opposite ends of the roller as small as possible to reduce the frictional resistance occurring between them.

The present invention relates to a turning bearing comprising, an outer ring provided on an inside circular surface thereof with two rows of outside grooved races each of which has a V-shape in a transverse cross-section, an inside ring provided on an outside circular surface thereof with two rows of inside grooved races each of which has a V-shape in a transverse cross-section, the inside grooved races of the inner ring lying in opposition to the outside grooved races of the outer ring, a plurality of rollers lying in raceways defined between the outside grooved races and the inside grooved races to circulate through the raceways while bearing loads as the outer ring and the inner ring rotate relative to each other, and a plurality of separators lying in the raceways in an arrangement interposed between the rollers adjoining each other, wherein the outside grooved races of the outer ring each have a race surface lying widthwise outwards of the outer ring to come into rolling contact with circular rolling surfaces of the rollers and a guide part lying widthwise inwards of the outer ring to bear one of axially opposite ends of the rollers in a sliding manner while turning relative to the one of the axially opposite ends of the rollers, wherein the inside grooved races of the inner ring each have a race surface lying widthwise inwards of the inner ring to come into rolling contact with the circular rolling surfaces of the rollers and a guide part lying widthwise outwards of the inner ring to bear other of axially opposite ends of the rollers in a sliding manner while turning relative to the other of the axially opposite ends of the rollers, wherein the guide parts in the outside grooved race and the inside grooved race include a guide surfaces each of which is provided on either of the outside grooved race of the outer ring and the inside grooved race of the inner to guide the axially opposite ends of the rollers, and relief sides reaching bottoms of the outside grooved race and the inside grooved race, wherein the inside circular surface of the outer ring lying on a side of the race surface is more biased radially inwards toward an axial center of the bearing than the inside circular surface lying on the side of the guide surface so that the inside circular surface on the outer ring is staggered or different in level on opposite sides of the outside grooved race to make greater the race surface than an effective contact length of the circular rolling surfaces of the rollers and correspondingly less the guide part in width than the race surface, and wherein the outside circular surface of the inner ring lying on the side of the race surface is more biased radially outwards away from the axial center of the bearing than the outside circular surface lying on the side of the guide surface, so that the outside circular surface on the inner ring is staggered or different in level on opposite sides of the inside grooved race to make greater the race surface than the effective contact length of the circular rolling surface of the roller and correspondingly less the guide part in widthwise dimension than race surface.

An end or end point on either of the race surface of the outer ring and the race surface of the inner ring continuing the relief side to form a beginning of the race surface is closer to the one of the axially opposite ends of the roller than an outset of a rounded bevel on the roller and lies within a dimensional range of the rounded bevel, and the end, lying nearby guide part, of an effective contact area of the race surface is closer to the one of the axially opposite ends of the roller than the outset of the rounded bevel on the roller.

Moreover, the widthwise dimension of the guide parts in the grooved races is longer than a radius of the roller, but shorter than a diameter of the roller.

The relief sides on the outer ring and the inner ring are provided for machining of the guide parts and the race surfaces, each of the relief sides having a tapered surface extending towards the race surface with more inclination than in the guide surface to form a relief space of wedged shape in a transverse cross-section, the tapered surface extending across the widthwise dimension of the radius or less of the roller, and further each of the tapered surfaces is rounded at a location crossing with an extension of the race surface.

Further, the guide surfaces in the guide parts of the outer ring and the inner ring are surfaces each of which inclines to make right angles relative to a rotating center of the roller and has a widthwise dimension extending across the rotating center of the roller over a length of the radius or less of the roller to prevent a skew of the roller.

The one end of the axially opposite ends of the roller sliding contact with the outside grooved race in the outer ring is guided while born against the guide surface at two contact locations diametrically opposite circumferential edges of the roller, and the other end of the roller sliding contact with the inside grooved race of the inner ring is guided while born against the guide surface at a single contact location lying on the rotating center of the roller.

Moreover, a loading hole to charge or incorporate the rollers with the separators into the raceway is provided in either of the outer ring and the inner ring, and an opening edge of the loading hole exposed to the raceway lies across an overall width of the race surface and the relief side in the guide part, but apart away from the guide surface.

With the turning bearing with the rollers interposed between the outer ring and the inner ring constructed as stated earlier, the inside circular surface of the outer ring flanked by the grooved races is staggered or different in level from the inside circular surface lying on the mounting surface of the bearing and, at the same time, the outside circular surface of the inner ring flanked by the grooved races is staggered or different in level from the outside circular surface lying on the mounting surface of the inner bearing. This construction makes sure of the maximum effective contact length on the raceway defined between the outer ring and the inner ring and correspondingly makes the guide part born against the axially opposite ends of the roller as small as possible to reduce the frictional resistance encountered when the axially opposite ends of the roller and the guide parts slide over each other. Moreover, the difference in level in the inside circular surface of the outer ring and the outside circular surface of the inner ring excludes foreign material from grooved races and further retains the lubricant. With the turning bearing of the present invention, thus, the effective contact length of the race surfaces on the inside and outside grooved races with the circular rolling surface of the roller is longer as compared with the prior construction, thereby improving the load rating in the bearing. The grooved races are protected effectively against foreign materials which would be otherwise make inroads on the rollers. A space made by the difference in level serves as a lubricant reservoir to improve lubrication performance. Reduction in width of the guide part results in making the guide surface for the axially opposite ends of the roller less thereby lessening the sliding contact area with the axially opposite ends of the roller. Thus, the frictional resistance encountered when the axially opposite ends of the roller and the guide parts slide over each other may be reduced to ensure smooth relative rotation between the outer ring and the inner ring.

With the turning bearing of the present invention, moreover, the inside circular surface of the outer ring lying widthwise inside of the ring is closer to the center of the roller rolling on the grooved race than the inside circular surface lying widthwise outside of the ring. Moreover, the outside circular surface of the inner ring lying widthwise outside of the ring is closer to the center of the roller rolling on the grooved race than the outside circular surface lying widthwise inside of the ring. As the result of the construction as stated just earlier, the end or end point, lying nearby guide part, of the relief side is closer to the any one of the axially opposite ends of the roller than the outset of the rounded bevel on the roller and lies within the dimensional range of the rounded bevel, and the end or end point of the effective contact area of the race surface is closer to the any one of the axially opposite ends of the roller than the outset of the rounded bevel on the roller and lies within the dimensional range of the rounded bevel. Thus, the effective contact length of the race surface in the grooved race is made longer than the effective contact length of the roller, so that the effective contact length of the race surface in the grooved race may be made longer, compared with the conventional turning bearing, to ensure the maximum load rating to improve the load-carrying capacity. With the turning bearing of the present invention, moreover, the guide part constituted with the guide surface and the relief side is larger widthwise than the radius of the roller, but smaller than the diameter of the roller. Thus, the guide surface though born securely against the axially opposite ends of the roller is reduced in bearing area coming into sliding contact with the axially opposite ends of the roller and therefore less in frictional resistance, making sure of smooth relative rotation between the outer ring and the inner ring.

With the turning bearing of the present invention, moreover, the relief sides are made in the guide parts with biased towards the race surfaces in the grooved races, each of the relief sides having a tapered surface extending towards the race surface with more inclination than in the guide surface to form a relief space of wedged shape in a transverse cross-section, the tapered surface extending across the widthwise dimension of the radius or less of the roller, and further each of the tapered surfaces being rounded at a location crossing with an extension of the race surface. As a result, the roller comes into sliding contact with the guide surface in the grooved race of the outer ring at diametrically opposite edges in the traveling direction of the roller on one of the axially opposite ends of the roller and further the roller is in opposition to the relief side in the grooved race of the inner ring at the radially outer edge on the other end of the axially opposite ends of the roller. When the roller runs through the guide races while turning about its own axis, the radially outer circumferential location of the axially opposite ends of the roller gets greater in revolving velocity relative to the guide surface. The relief sides are made on the guide surfaces opposing to the radially outer circumferential locations of the axially opposite ends of the roller to get rid of sliding contact with the axially opposite ends of the roller to thereby lessen the frictional resistance caused by sliding contact, ensuring smooth relative rotation between the outer ring and the inner ring. Moreover, the race surfaces and the guide parts having the guide surfaces and the relief sides in the outside grooved races of the outer ring and the inside grooved races of the inner ring may be simultaneously machined with the grinding wheel. Moreover, the loading hole to charge or incorporate the rollers with the separators into the raceway is provided in either of the outer ring and the inner ring, and the opening edge of the loading hole exposed to the raceway lies across an overall width of the race surface and the relief side in the guide part, but apart away from the guide surface. Thus, the axially opposite ends of the rollers are free of engagement or collision with the opening edge of the loading hole and therefore the rollers are allowed to roll smoothly without falling into or getting caught at the opening edge of the loading hole.

DETAILED DESCRIPTION OF THE EMBODIMENT

A preferred embodiment of the turning bearing with the rollers lying between outer ring and the inner ring of the present invention will be explained in detail with reference to the accompanying drawings. The turning bearing constructed according to the present invention will find extensive applications in relative turning, rocking and turning systems used in a diversity of machinery including semiconductor fabricating equipments, precision machines, measurement/inspection equipments, medical appliances, industrial robots, various assembling machines, conveyor machines, machine tools, micromachines and so on.

Figure 1:
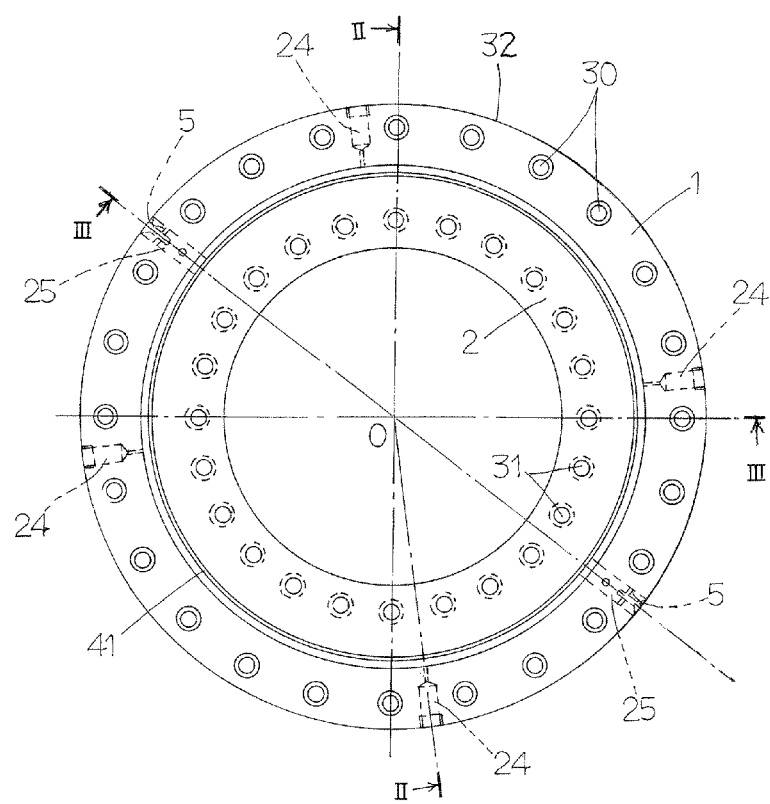
FIG. 1 is a view in front elevation of a preferred embodiment of a double-row angular roller bearing equipped with rollers between an outer ring and an inner ring in a turning bearing according to the present invention.
Figure 2:
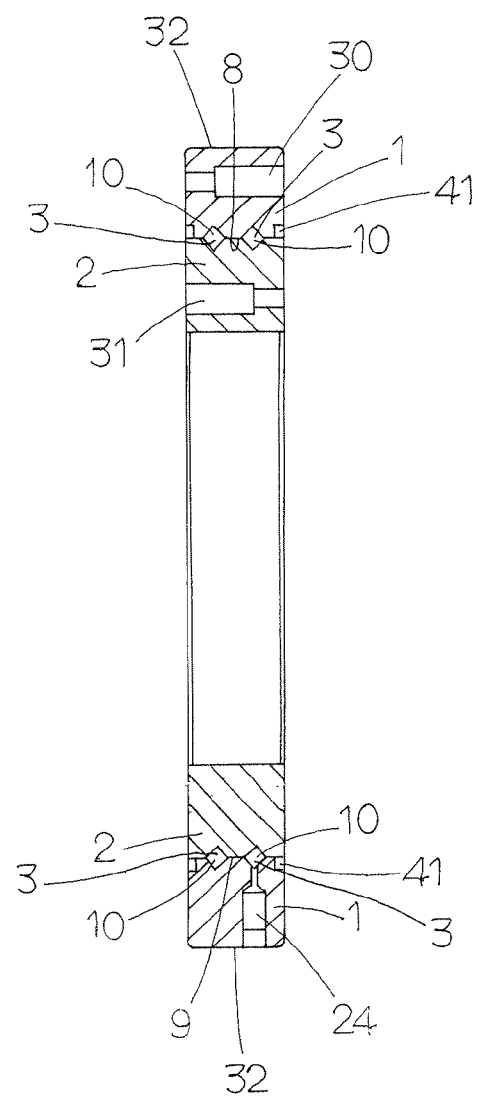
FIG. 2 is a view in transverse cross-section of the double-row angular roller bearing of FIG. 1, taken on the plane lying on the lines II-0-II of FIG. 1.
Figure 3:
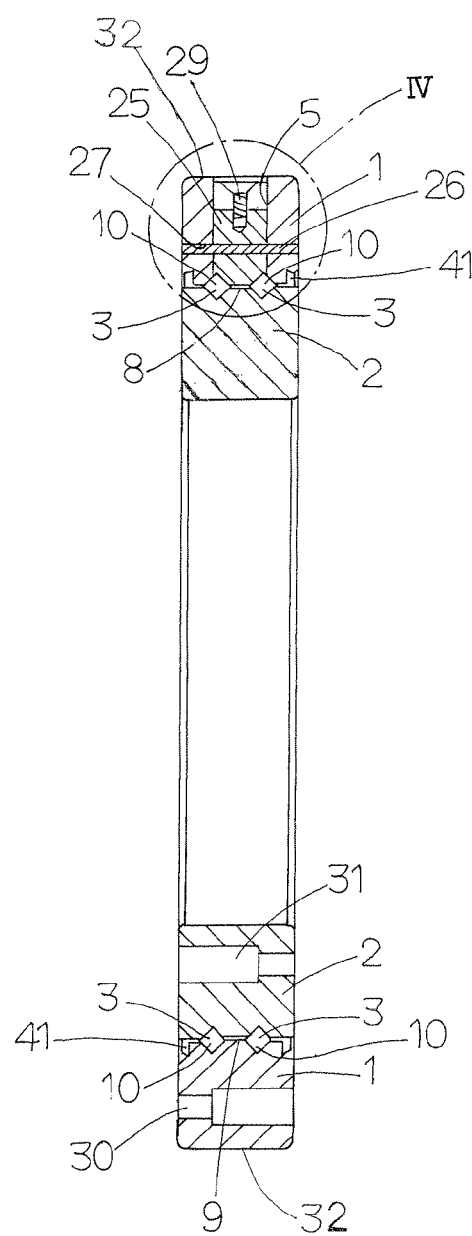
FIG. 3 is a view in transverse cross-section of the double-row angular roller bearing of FIG. 1 in which a loading hole is common to two outer grooved races, taken on the plane lying on the lines III-0-III of FIG. 1.
Figure 4:
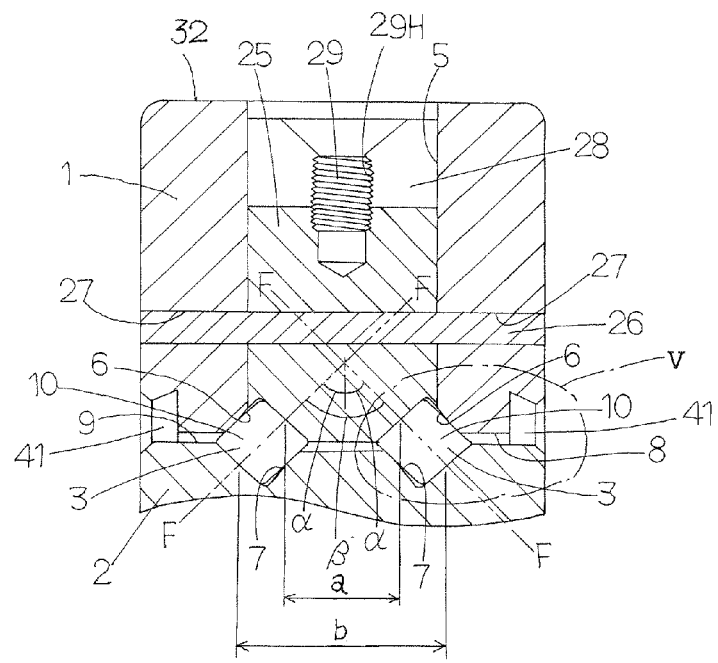
FIG. 4 is an enlarged view in transverse cross-section of an area encircled with a sign IV in FIG. 3.
Figure 8:
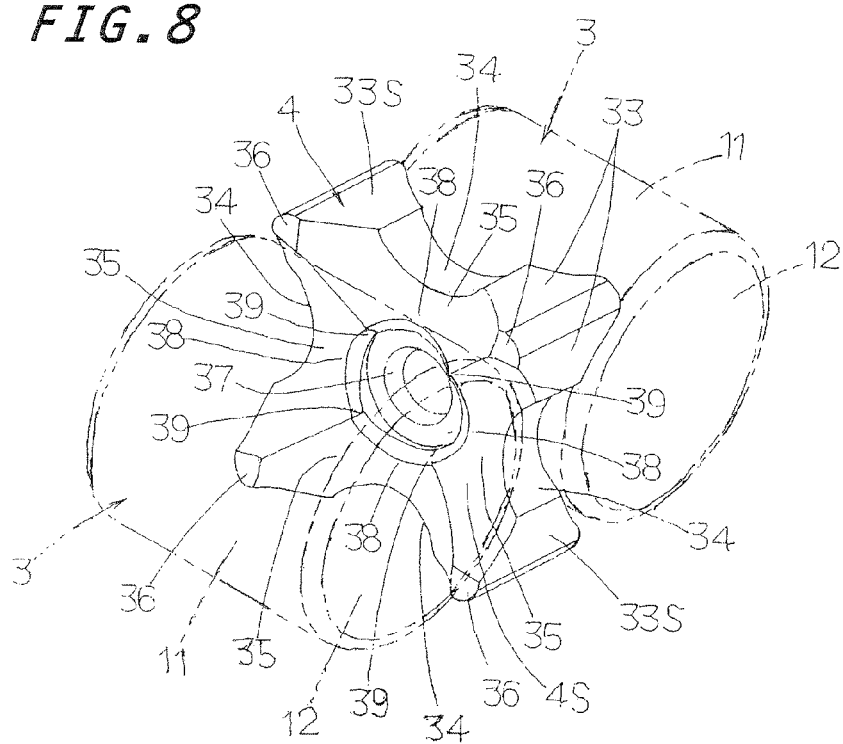
FIG. 8 is a view in perspective showing a preferred embodiment of a separator interposed between the rollers adjoining each other.

Referring to FIGS. 1 to 4, the turning bearing is in general composed of an outer ring 1, inner ring 2, and rollers 3 and separators 4 (see FIG. 8) lying in raceways 10 defined between the outer ring 1 and the inner ring 2, the separators 3 being disposed between the rollers adjoining each other. The turning bearing is a double-row angular-contact roller bearing in which either of the outer ring 1 and the inner ring 2, especially the outer ring 1 in the embodiment shown here, has a loading hole 5 to charge or incorporate the rollers 3 and the separators 4 into the plural rows of raceways, especially two rows in the embodiment shown here, defined between grooved races 6 and 7 of V-shape in transverse section. With the outer ring 1, the outside grooved races 6 of V-shape in transverse cross-section are cut in an inside circular surface 8 of the outer ring 1. With the inner ring 2, the inside grooved races 7 of V-shape in transverse cross-section are cut in an outside circular surface 9 of the inner ring 2. In the embodiment discussed here, moreover, an angle α between a line of action F-F on the outside grooved race 6 and the inside grooved race 7 and a radial direction of the bearing axis, or a contact angle between a direction along which the load of the roller is born against the grooved races and a plane perpendicular to the bearing axis, is 45 degrees as shown in FIG. 4. As a result, a crossing angle β at which extended lines of lines of action F-F on the outside grooved races 6 and the inside grooved races 7 of the different rows intersect in perpendicular to each other is 90 degrees. The outer ring 1 and the inner ring 2 have some counterbored holes 30, 31 which are used to fasten the turning bearing to other components such as basements, instruments and so on. Though the grooved races 6, 7 in the angular-contact roller bearing may be placed in either of back-to-back arrangement and front-to-front arrangement, the grooved races 6, 7 in the angular-contact roller bearing of the present invention are designed in the back-to-back arrangement. With the back-to-back arrangement, as shown in FIG. 4, a distance b between center lines of race surfaces 15 in the inside grooved races 7 is larger than a distance a between center lines of race surfaces 13 in the outside grooved races 6. Moreover, the lines of action F-F of roller loads of the rollers 3 rolling through raceways 10 defined between the outside grooved races 6 and the inside grooved races 7 intersect each other outside the pitch circles of rollers 3. The angular-contact roller bearing of back-to-back arrangement is large in the distance between the lines of action of roller loads and, therefore, has a high load-carrying capacity against moment load.

According to the design specification in the embodied turning bearing of the present invention, for example, a diameter of the inside circular surface of the inner ring 2, or inside diameter of the ring 2 was 160 mm and a diameter of the outside circular surface of the outer ring 1, or outside diameter of the ring 1 was 295 mm. Widths or breadths of the outer ring 1 and the inner ring 2 were each 35 mm. The ratio of a diameter Da and an axial length Lr of the roller 3 was for example nearly 1 to 1, especially, the dimension φ of the diameter Da was 6 mm and the axial length Lr was slightly smaller than the dimension φ of the diameter Da. With the turning bearing of the present invention, the axially opposite sides of the bearing have circular slots 41 to snugly fit over dust-proofing sealing members which extends circumferentially to exclude dirt and foreign matters from circular clearance left between the outside circular surface of the inner ring 2 and the inside circular surface of the outer ring 2. The outer ring 1 has oiling holes 24. With the embodiment illustrated, there were provided four oiling holes 24 which were arranged around the outer ring 1 in a way any adjacent two holes were spaced angularly away from each other across, for example 90 degrees. Each oiling hole 24 had a diameter φ of, for example 2 mm and female threads to fit over a tubular screw driven from an outside circular surface 32 of the outer ring 1. With the embodied turning bearing of the present invention, the loading hole 5 was provided around the outer ring 1 at only one position out of the interference with the oiling holes 24. With the turning bearing with the separators constructed according to the present invention, a plurality of rollers 3 together with the separators 4 interposed between adjacent rollers is charged or incorporated through the loading hole 5 which is thereafter closed with a closure 25. Moreover, the outer ring 1 as shown in FIG. 4 has a locking pin hole 27 extending across the loading hole 5. The closure 25 after having fit in the loading hole 5 is held in place with a locking pin 26 driven into the locking pin hole 27. An example of the closure 25 applicable to the turning bearing is described in Japanese Laid-Open Patent Application No. 2010-230 053. The closure 25 has an innermost end which is exposed to the grooved race 6 of the outer ring 1 and made to conform in shape to the grooved race 6. Moreover, the closure 25 has slits 28 extended axially in circular wall of the closure 25 and another slits extended circumferentially near the deep ends of the slits 28. The closure 25 has a threaded hole 29H at the outermost end opposite to the innermost end thereof. As a flat-head screw 29 is tightened or wedged into the threaded hole 29H, the closure 25 is expanded radially outwards along the slits 28 to firmly secure the closure 25 inside the loading hole 5 in the outer ring 1. The outermost end of the closure 25 is kept at a location receding below the outside circular surface 32 of the outer ring 1.

Figure 5:
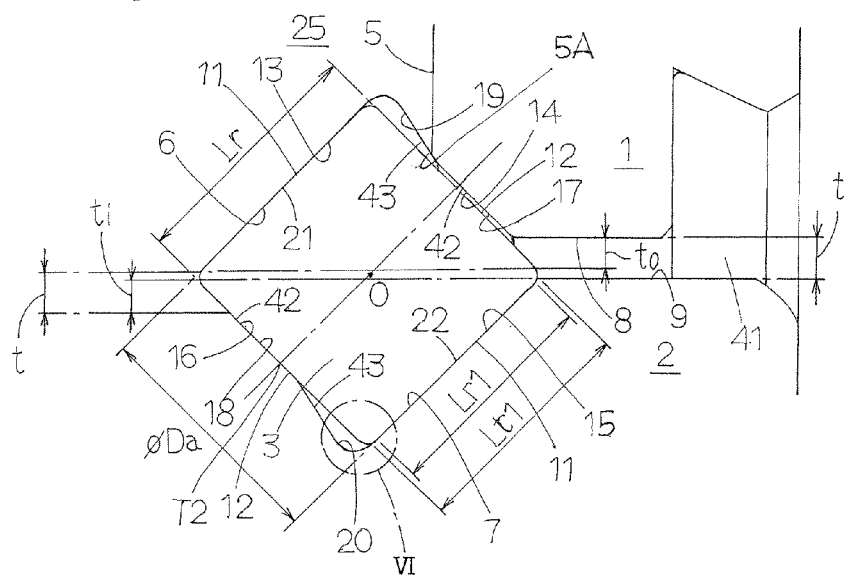
FIG. 5 is an enlarged view in transverse cross-section of an area encircled with a sign V in FIG. 4 to show the roller and a raceway defined between a grooved race cut in a circular inside surface of an outer ring and a grooved race cut in a circular outside surface of an inner ring.

The turning bearing constructed according to the present invention features that the inside circular surface 8 of the outer ring 1 is made staggered or different in level on opposite sides of the outside grooved race 6 formed on the inside circular surface 8 of the outer ring 1 while the outside circular surface 9 of the inner ring 2 is made staggered or different in level on opposite sides of the outside grooved race 7 formed on the outside circular surface 9 of the inner ring 2 so as to make greater the rolling-contact area of the race surfaces 13, 15 with the circular rolling surface 11 of the roller 3 and correspondingly less the contact area of the guide parts 14, 16 with the axially opposite ends of the roller 3. The outside grooved race 6 of the outer ring 1 as shown in FIGS. 4 and 5 has the V-shape in transverse cross-section, one side of the V-shape being the race surface 13 and the other side being the guide part 14. The guide part 14 includes a relief side 19 for the grinding tool (not shown) in machining procedure and a guide surface 17 for guidance of any one of the axially opposite ends 12 of the roller 3. The inside grooved race 7 of the inner ring 2 in turn has the V-shape in transverse cross-section, one side of the V-shape being the race surface 15 and the other side being the guide part 16. The guide part 16 includes a relief side 20 for the tool (not shown) in machining procedure and a guide surface 18 for guidance of the other one of the axially opposite ends 12 of the roller 3. Moreover, the outside grooved race 6 on the outer ring 1 is constituted with the race surface 13 on which the circular rolling surface 11 of the roller 3 rolls through, the race surface 13 lying in widthwise inner side of the outer ring 1, and the guide part 14 having the guide surface 17 on which any one of the axially opposite ends 12 of the roller 3 slides while rotating on its own axis, the guide part 14 lying in widthwise outer side of the outer ring 1. The inside grooved race 7 on the inner ring 2 is constituted with the race surface 15 on which the circular rolling surface 11 of the roller 3 rolls through, the race surface 15 lying widthwise outer side of the inner ring 2, and the guide part 16 having the guide surface 18 on which any one of the axially opposite ends 12 of the roller 3 slides while rotating on its own axis, the guide part 14 lying widthwise inner side of the outer ring 2. The guide parts 14, 16 of the outside grooved race 6 and the inside grooved race 7 include the guide surfaces 17, 18 formed on the inside circular surface 8 of the outer ring 1 and the outside circular surface 9 of the inner ring 2, respectively, to guide the axially opposite ends of the roller 3, and the relief sides 19, 20 reaching the bottoms of the outside grooved race 6 and the inside grooved race 7, respectively.

With the outer ring 1 in the turning bearing of the present invention, moreover, the inside circular surface 8 lying on the side of the race surface 13 is more biased radially inwards toward the center of the ring 1 than the inside circular surface 8 lying on the side of the guide surface 17, so that the inside circular surface 8 on the outer ring 1 is made staggered or different in level on opposite sides of the outside grooved race 6 to make greater the race surface 13 than the effective contact length of the circular rolling surface 11 of the roller 3 and correspondingly less the guide part 14 in width than race surface 13. With the inner ring 2, the outside circular surface 9 lying on the side of the race surface 15 is more biased radially outwards away from the center of the ring 2 than the outside circular surface 9 lying on the side of the guide surface 18, so that the outside circular surface 9 on the inner ring 2 is made staggered or different in level on opposite sides of the inside grooved race 9 to make greater the race surface 15 than the effective contact length of the circular rolling surface 11 of the roller 3 and correspondingly less the guide part 16 in widthwise dimension than race surface 13. The race surface 13 of the outside grooved race 6 is made in an inclined or tapered surface 21 and the race surface 15 of the inside grooved race 7 is made in an inclined or tapered surface 22. The inside circular surface 8 of the outer ring 1 lying widthwise inside of the ring 1 is closer to the center 0 of the roller 3 rolling on the grooved race 6 than the inside circular surface 8 lying widthwise outside of the ring 1. Moreover, the outside circular surface 9 of the inner ring 2 lying widthwise outside of the ring 2 is closer to the center 0 of the roller 3 rolling on the grooved race 6 than the outside circular surface 9 lying widthwise inside of the ring 2. As the result of the construction as stated just earlier, there is a radial difference or gap $t_0$ in level between the inside circular surface 8 lying on a mounting surface of the outer ring 1 and the inside circular surface 8 flanked by the grooved races 6. There is a radial difference or gap $t_i$ in level between the outside circular surface 9 lying on a mounting surface of the inner ring 2 and the outside circular surface 9 flanked by the grooved races 7.

An opening 5A of the loading hole 5 exposed to the raceway 10 in the outer ring 1 lies across the overall width of the race surface 13 and the relief side 19 in the guide part 14 in such a relation that an edge surrounding the opening 5A is well within the range of the relief side 19 apart away from the guide surface 17. As the result of the construction as stated just earlier, the closure 25, after having fit into the loading hole 5, is free of engagement or collision with the axially opposite ends of the roller 3 at an innermost edge thereof exposed to the raceway 10, so that the rollers 3 are allowed to roll smoothly without falling into the opening 5A or getting caught at the closure 25. In addition, the effective contact length $Lt_1$ common to the race surface 13 of the outside grooved race 6 and the race surface 15 of the inside grooved race 7 is greater than the effective contact length $Lr_1$ of the roller 3 while the widthwise dimension of the guide parts 14, 16 in the grooved races 6, 7 is longer than $Da/2$, but shorter than the diameter $Da$ of the roller 3. On the other hand, the guide surfaces 17, 18 in the guide parts 14, 16 of the outer ring 1 and the inner ring 2 are made in slant surfaces 42, each of which inclines to make a right angle relative to the rotating center 0 of the roller 3 and has a widthwise dimension extending across the rotating center 0 of the roller 3 over a length enough to prevent the skew of the roller 3, but $Da/2$ or less.

Figure 6:
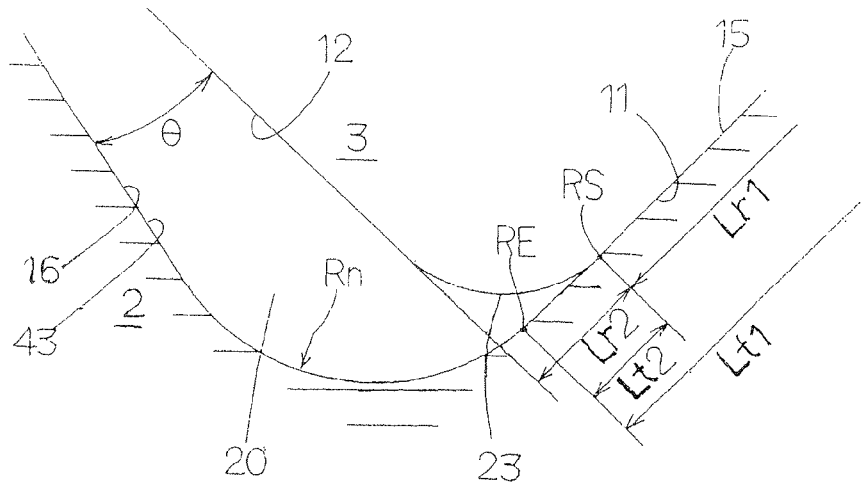
FIG. 6 is an enlarged view explanatory of an area encircled with a sign VI in FIG. 5.

With the turning bearing of the present invention, a distance $t$ of a clearance left between the inside circular surface 8 of the outer ring 1 and the outside circular surface 9 of the inner ring 2 is kept constant across the overall widths of the outer ring 1 and the inner ring 2 with the exception of the locations of the grooved races 6, 7 and the circular slot to snugly fit over a dust-proofing sealing member. The relief sides 19, 20 are cut in the guide surfaces 17, 18 circularly of the outside grooved race 6 and the inside grooved race 7 in adjacency to the race surfaces 13, 15. The relief sides 19, 20 each have a widthwise dimension of less than $Da/2$ in the radial direction of the roller 3. Relief spaces defined between the relief sides 19, 20 and the circular rolling surface 11 of the roller 3 incorporated in the raceway 10 have a wedged shape when viewed in a transverse cross-section taken on the plane lying on the radial direction of the bearing. The relief sides 19, 20 as shown in FIG. 6 extend from the guide surfaces 17, 18 away from the axially opposite ends of the roller 3 at angles 6 relative to the axially opposite ends of the roller 3. Upon simultaneous machining of the guide parts 14, 16 and the race surfaces 13, 15 on the outer ring 1 and the inner ring 2, the relief sides 19, 20 are made with tapered surfaces 43 extending across the widthwise dimension of Da/2 or less in the radial direction of the roller 3. More especially, each of the tapered surfaces 43 extends towards the race surface 13 or 15 with more inclination than in the guide surfaces 17 or 18 to form the relief space of the wedged shape in transverse cross-section. In addition, the tapered surfaces 43 are each rounded at a location crossing with an extension of the race surface 13 or 15. In the embodiment, the angle θ was 12 degrees. The arced shape at the locations where the relief sides 19, 20 cross with the race surfaces 13, 15, as shown in FIG. 6 had the radius of curvature of 0.5 mm at the maximum. The depth of the relief sides 19, 20 below the guide surfaces 17, 18 was less than 10% of the diameter Da of the roller 3, especially 7.5%, namely 0.45 mm. The turning bearing of the present invention may be applied to another version in which the grooved races are designed in front-to-front arrangement.

Figure 7:
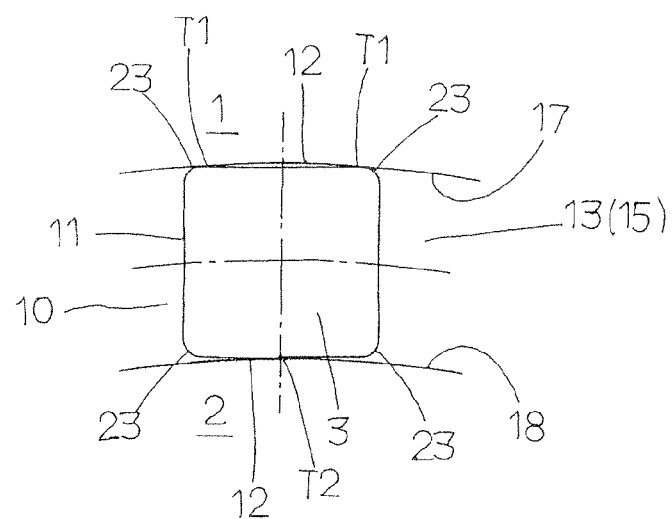
FIG. 7 is a view in perspective showing the roller rolling through the raceway defined between the inside grooved race cut on the outer ring and the outside grooved race cut on the inner ring.

With the turning bearing constructed as stated earlier, as shown in FIG. 6, the effective contact length Lt1 of the race surface 13, 15 on the race surfaces 13, 15 of the outside grooved race 6 and the inside grooved race 7 is designed longer than the effective contact length Lr1 of the roller 3. Now considering that the effective contact length of the roller 3 is Lr1, the effective contact length of the race surface 13, 15 is Lt1 and the axial length of a rounded bevel 23 of the roller 3 is Lr2, the relations of them are Lr1<Lt1 and Lt1<Lr1+2× Lr2. Moreover, an end or end point RE, lying nearby guide part 14, 16, of the effective contact area of the race surface 13, 15 is closer to the any one of the axially opposite ends 12 of the roller 3 than the outset RS of the rounded bevel 23 on the roller 3 and lies within the dimensional range of the rounded bevel 23. When the length Lt2 is expressed as the length of from the outset RS of the rounded bevel 23 of the roller 3 to the end or end point RE of the effective contact area on the race surface 13, 15, the relation between Lt2 and Lr2 is Lt2<Lr2. With the race surface 13 of the outer ring 1 and the race surface 15 of the inner ring 2, more especially, the end or end point RE continuing with the relief side 19, 20 to form the beginning of the race surface 13, 15 is closer to the any one of the axially opposite ends 12 of the roller 3 than the outset RS of the rounded bevel 23 on the roller 3 and lies within the dimensional range of the rounded bevel 23. As shown in FIGS. 5 and 7, the end 12 of the roller 3 rolling contact with the outside grooved race 6 in the outer ring 1 is guided while born against the guide surface 17 on substantially point contact phase at two contact locations T1 diametrically opposite circumferential edges of the roller 3. Another end 12 of the roller 3 rolling contact with the inside grooved race 7 of the inner ring 2 is guided while born against the guide surface 18 on substantially line contact phase at a single contact location T2 lying on the rotating center 0 of the roller 3.

Various shapes of the separator may be available for the turning bearing constructed according to the present invention. For example, a version of the separator is shown in FIGS. 8 to 12. Another version is shown in FIG. 13 and a further another version is shown in FIG. 14.

Figure 10:
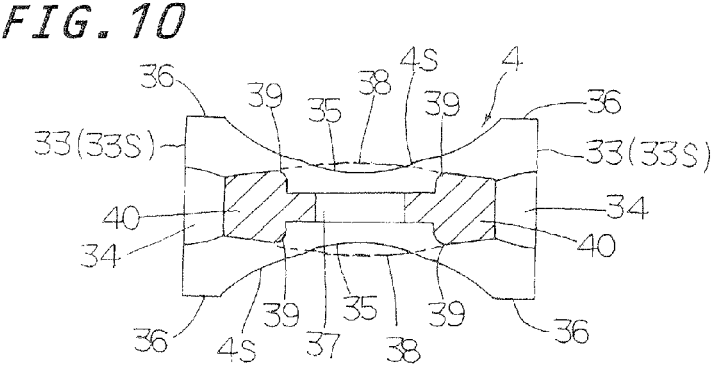
FIG. 10 is an enlarged view in transverse cross-section of the separator of FIG. 9, taken on the plane lying on the lines X-X of FIG. 9.
Figure 11:
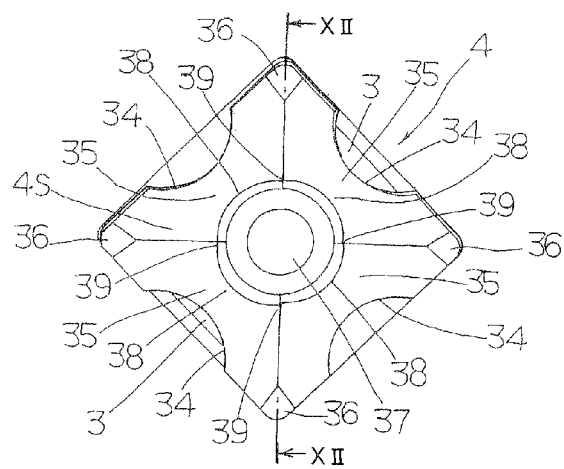
FIG. 11 is a view in front elevation showing the side of the separator to fit over the roller.
Figure 12:
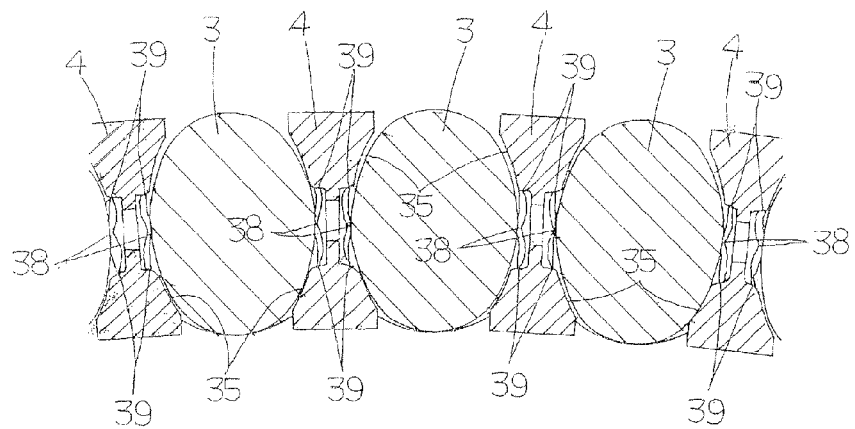
FIG. 12 is a view explanatory of disposition between the separator and the roller, taken on the plane lying on the lines XII-XII of FIG. 11 and seen from a through-hole of the separator.

The separator 4 will be hereinafter described in detail with reference to FIGS. 8 to 12. The separator 4 is charged or loaded through the loading hole 5 into the raceway 10 defined between the outside grooved race 6 on the outer ring 1 and the inside grooved race 7 on the inner ring 2 in such a way that a leading and trailing sides 4S of the separator 4 come into rolling contact with adjoining rollers 3. To this end, the separator 4 is designed to have a major body 40 of a substantially quadrilateral configuration surrounded with the peripheral surface 33 of four sides 33S each of which has a thickness in the traveling direction of the roller 3 enough to space out the rollers 3 apart from each other in the traveling direction of the rollers 3. The separator 4 is further provided at the center of the major body 40 with the through-hole 37. Especially, the separator 4 has the substantially quadrilateral configuration when viewed from the side of a concaved surface 35 to fit over the circular rolling surface 11 of the roller 3. Recesses 34 are made on the sides 33S of the peripheral surface 33 of the separator 4, one to each side 33S. On the leading and trailing sides 4S of the separator 4 to fit over the circular rolling surface of the roller 3, there are provided the concaved surfaces 35 which each extend in the direction of the circular rolling surface between the opposite sides 33S with arcing in transverse cross-section in conformity with circular rolling surface 11 of the roller 3, and cross at 90 degrees each other in a crisscrossed relation. The raised flats 36 are formed at four corners. The separator 4 is installed in the raceway 10 such that the peripheral surface 33 lies in opposition to both the guide parts 14, 16 and the race surfaces 13, 15 of the grooved races 6, 7 on the outer ring 1 and the inner ring 2. With the separator 4, more especially, each of the concaved surfaces 35 arcs in transverse cross-section between the sides of the peripheral surface 33 lying in opposition to the race surfaces 13, 15. Portions 39 protruding in the axial direction of the separator 4 to come into contact with the roller 3 are formed on the circular edge of the through-hole 37 at four locations lying on phantom lines connecting the center and four raised corners 36 of the separator 4. The concaved surface 35 on the side 4S of the separator 4 is arched in transverse cross-section in conformity with the rolling surface 11 of the roller 3, as shown in FIGS. 11 and 12, and born against the roller 3 for rotation only at a narrow area near around the middle in the axial direction of the roller 3.

Figure 9:
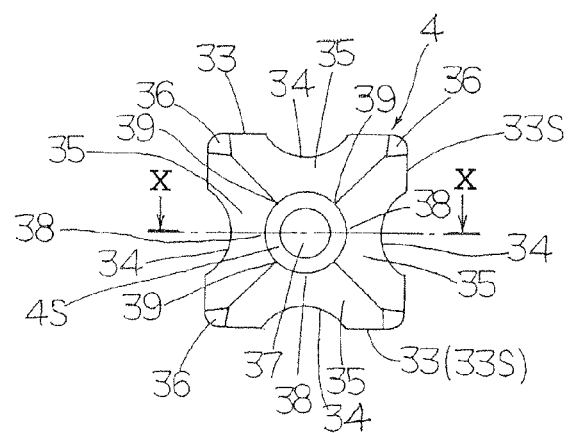
FIG. 9 is a view in front elevation of the separator of FIG. 8.

With the separator 4 constructed as stated earlier, the concaved surfaces 35 as shown in FIG. 9 are formed in symmetry to make the crisscrossed relation around the axial center of the through-hole 37, ensuring the correct contacting condition with the rollers 3 irrespective of in which posture the separator 4 is loaded in the raceway 10. Moreover, the concaved surfaces 35 on the separator 4 are contoured in arced or curved profiles that the concaved surfaces 35 as shown in FIG. 10 bulge or rise gradually to provide the arcing bulge 38 as their concavities get closer towards the centers thereof. It will be considered that the separator 4 comes into contact with the circular rolling surface 11 of the roller 3 in different contact conditions or postures. Considering the separator 4 comes into contact with the roller 3 in an inclined relation relative each other, the arcing bulge 38 makes only a point contact with the roller 3 in either of a circumferential direction and an axial direction the roller 3 depending on the tilted contact condition between the roller 3 and the separator 4, so that the arcing bulge 38 functions staving off the surface contact between the separator 4 and the roller 3 thereby keeping the contact condition reducing the frictional resistance encountered between the surfaces of the separator 4 and the roller 3. The recesses 34 on the sides 33S of the peripheral surface 33 around the separator 33 are made arced in transverse cross-section on the plane perpendicular to the axial direction of the separator 4. The through-hole 37 in the separator 4 is counterbored on the opposite sides of the separator 4 to have stepwise radially enlarged areas which serve as lubricant reservoirs. With the separator 4 constructed as stated just earlier, the flow of lubricant is made easier by combination of the central hole 37 with the recesses 34 on the peripheral 33. The circular rolling surface 11 of the roller 3 as shown in FIGS. 11 and 12 comes into contact with the separator 4 in the vicinity of the through-hole 37 lying at the center of the concaved surfaces 35 of the separator 4. With the separator 4 of the substantially quadrilateral configuration when viewed from the concaved surface 35 to fit over the roller 3, each side 33S of the quadrilateral was for example 5.95 mm and the four arced recesses 34 cut on the peripheral surface 33 were identical each other in dimension, for example each having a radial dimension of 1.5 mm. The concaved surfaces 35 crisscrossed each other to fit over the roller 3 were each made to have a radial dimension of for example 3.1 mm. The through-hole 37 counterbored at the opposite ends thereof had a diameter ϕ of, for example 1.5 mm at the axial middle area thereof and 2.5 mm at axially opposite counterbored ends. The raised portions 36 whose tops are made flat were at four corners of the separator 4 when viewed at the front of the separator 4. The concaved surfaces 35 of the separator 4, as intersecting in perpendicular to each other as shown in FIG. 9, are narrow about the central through-hole 37, but radiate outward or splay out towards each of the sides 33S to form four substantially triangular configurations each of which diverges from the location near the through-hole 37 towards the side 33S. More especially, the concaved surfaces 35 of the separator 4 at their sides 33S confront the circular rolling surface 11 of the roller 3 over wide area of the axial dimension of the circular rolling surface 11 of the roller 3. In other words, the separator 4 fits over the circular rolling surface across wider area near the axially opposite ends 12 of the roller 3 than about the middle in the axial direction of the roller 3. Thus, the concaved surface 35 splays out towards the side 33S to the dimension near the diameter of the axially opposite ends 12 of the roller 3.

Figure 13:
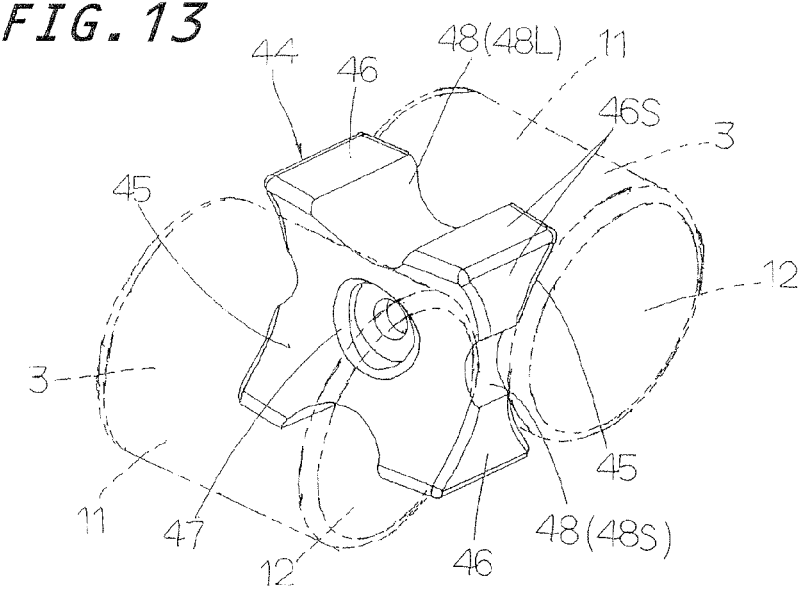
FIG. 13 is a view in perspective showing another version of the separator flanked by the rollers.
Figure 14:
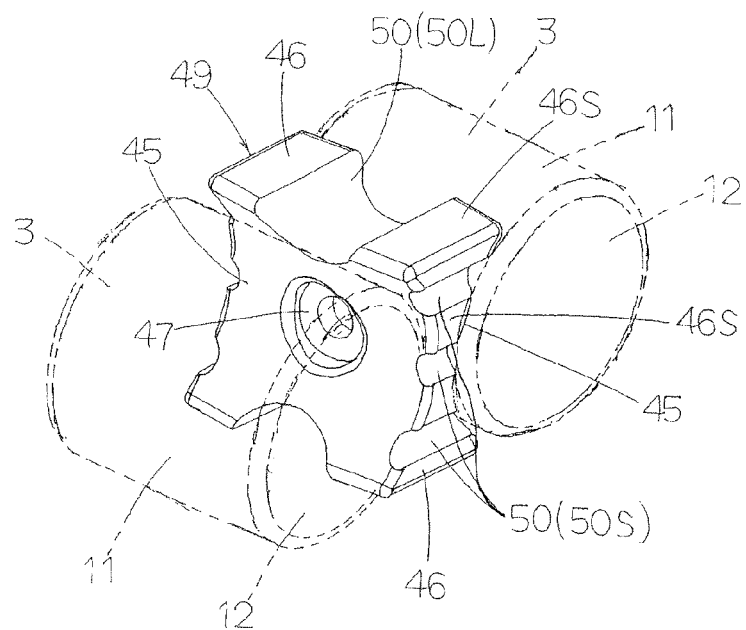
FIG. 14 is a view in perspective showing a further another version of the separator as shown in FIG. 13.
Figure 15:
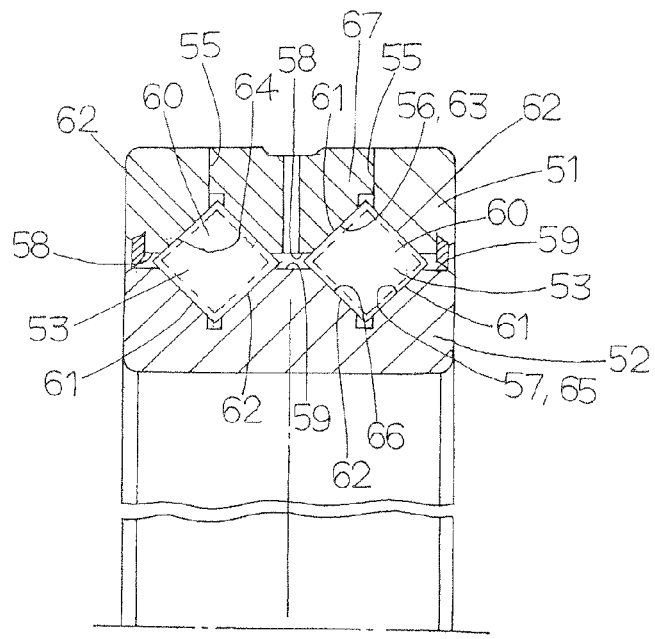
FIG. 15 is a view in transverse cross-section showing a prior double-row roller bearing in which the rollers roll through the raceways defined between the grooved races cut in the circular inside surface of the outer ring and the grooved races cut in the circular outside surface of the inner ring.
Figure 16:
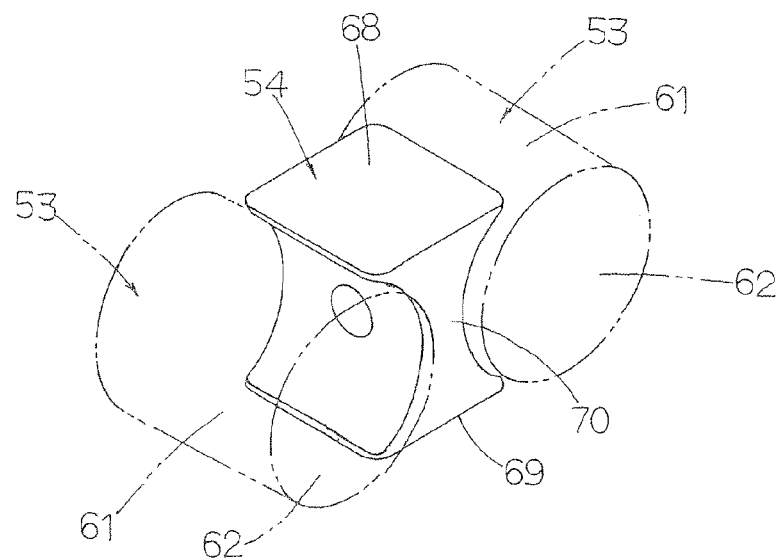
FIG. 16 is a view in perspective showing a prior separator lying between the rollers in the prior double-row roller bearing of FIG. 15.
Figure 17:
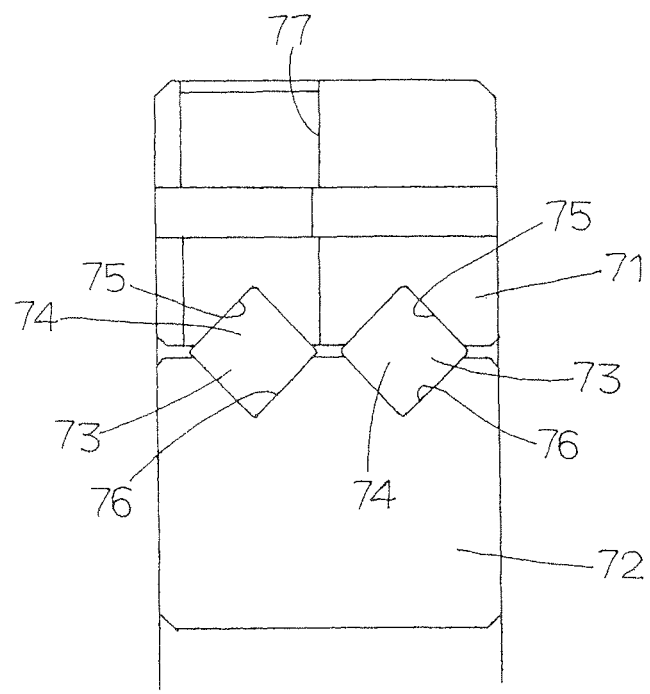
FIG. 17 is a view in transverse cross-section of the prior double-row roller bearing in which the loading hole to throw the rollers into the raceway is made every raceway, one to each raceway.

Next, referring to FIG. 13, there is shown another version of the separator 44 which is substantially similar in construction to the separator 4 constructed as stated earlier, excepting apart from a concavity 45 born against the circular rolling surface 11 of the roller 3 spreading in only one direction as opposed to the concaved surfaces 35 crisscrossed each other on the separator 4. The separator 44 has a thick body 46 having a widthwise dimension or a thickness enough to isolate the adjoining rollers 3 apart away from each other in the traveling direction of the rollers. The thick body 46 has a substantially quadrilateral or square shape defined with four peripheral sides 46S and further has a through-hole 47 at the center thereof. With the separator 44, moreover, the peripheral sides 46S of the thick body 46 have recesses 48. More especially, major recesses 48L are made on the sides 46S lying in opposition to the race surfaces 13, 15 of the grooved races 6, 7, which make rolling contact with the circular rolling surfaces 11 of the rollers 3. On the other hand, minor recesses 48S are made on the sides 46S lying in opposition to the guide parts 14, 16 of the grooved races 6, 7, which make sliding contact with the axially opposite ends of the rollers 3.

A further another separator 49 shown in FIG. 14 is substantially similar in construction to the separator 4 constructed as stated earlier, excepting apart from a concavity 45 born against the circular rolling surface 11 of the roller 3 spreading in only one direction as opposed to the concaved surfaces 35 crisscrossed each other on the separator 4. The separator 49 has a thick body 46 having a widthwise dimension or a thickness enough to isolate the adjoining rollers 3 apart away from each other in the traveling direction of the rollers. The thick body 46 has a substantially quadrilateral or square shape defined with four peripheral sides 46S and further has a through-hole 47 at the center thereof. With the separator 49, moreover, the peripheral sides 46S of the thick body 46 have recesses 50. More especially, major recesses 50L are made on the sides 46S lying in opposition to the race surfaces 13, 15 of the grooved races 6, 7, which make rolling contact with the circular rolling surfaces 11 of the rollers 3. On the other hand, three minor recesses 50S are made on the sides 46S lying in opposition to the guide parts 14, 16 of the grooved races 6, 7, which make sliding contact with the axially opposite ends of the rollers 3.

What is claimed is:

1. A turning bearing comprising:
   an outer ring provided on an inside circular surface thereof with two rows of radially inward grooved races located radially inward of the outer ring, each radially inward grooved race having a V-shape in a transverse cross-section,
   an inner ring provided on an outside circular surface thereof with two rows of radially outward grooved races located radially outward of the inner ring, each radially outward grooved race having a V-shape in a transverse cross-section, the radially outward grooved races of the inner ring lying in opposition to the radially inward grooved races of the outer ring,
   a plurality of rollers lying in raceways defined between the radially inward grooved races and the radially outward grooved races to circulate through the raceways while bearing loads as the outer ring and the inner ring rotate relative to each other, and
   a plurality of separators lying in the raceways in an arrangement interposed between the rollers adjoining each other,
   wherein the radially inward grooved races on the outer ring each have a race surface lying widthwise outwards of the outer ring to come into rolling contact with circular rolling surfaces of the rollers and a guide part lying widthwise inwards of the outer ring to bear one of axially opposite ends of the rollers in a sliding manner while turning relative to the one of the axially opposite ends of the rollers,
   wherein the radially outward grooved races on the inner ring each have a race surface lying widthwise inwards of the inner ring to come into rolling contact with the circular rolling surfaces of the rollers and a guide part lying widthwise outwards of the inner ring to bear other of axially opposite ends of the rollers in a sliding manner while turning relative to the other of the axially opposite ends of the rollers,
   wherein the guide parts in the radially inward grooved races and the radially outward grooved races include guide surfaces each of which is provided on either of the radially inward grooved races of the outer ring and the radially outward grooved races of the inner ring to guide the axially opposite ends of the rollers, and relief sides reaching bottoms of the radially inward grooved races and the radially outward grooved races,
   wherein the inside circular surface of the outer ring lying on a side of the race surface is more biased radially inwards toward an axial center of the bearing than the inside circular surface lying on the side of the guide surface so that the inside circular surface on the outer ring is staggered or different in level on opposite sides of the radially inward grooved race to make the race surface larger than an effective contact length of the circular rolling surfaces of the rollers and correspondingly make a length of the guide part in widthwise dimension smaller than the race surface, and wherein the outside circular surface of the inner ring lying on the side of the race surface is more biased radially outwards away from the axial center of the bearing than the outside circular surface lying on the side of the guide surface, so that the outside circular surface on the inner ring is staggered or different in level on opposite sides of the radially outward grooved race to make the race surface larger than the effective contact length of the circular rolling surface of the roller and correspondingly make a length of the guide part in widthwise dimension smaller than race surface, and wherein a loading hole to charge or incorporate the rollers with the separators into the raceway is provided in either of the outer ring and the inner ring, and an opening edge of the loading hole exposed to the raceway lies across an overall width of the race surface and the relief side in the guide part, but apart away from the guide surface.

2. A turning bearing constructed as defined in claim 1, wherein an end on either the race surface of the outer ring or the race surface of the inner ring located at a beginning of the race surface is closer to the one of the axially opposite ends of the roller than a start of a rounded bevel on the roller and lies within a rounded bevel on the roller, whereby the end, of an effective contact area of the race surface is closer to the axially opposite ends of the roller than the outset of the rounded bevel on the roller.

3. A turning bearing constructed as defined in claim 1, wherein the widthwise dimension of the guide parts in the grooved races is longer than a radius of the roller, but shorter than a diameter of the roller.

4. A turning bearing constructed as defined in claim 1, wherein the relief sides on the outer ring and the inner ring are provided for machining of the guide parts and the race surfaces, each of the relief sides having a tapered surface extending towards the race surface with more inclination than in the guide surface to form a relief space of wedged shape in a transverse cross-section, the tapered surface extending across the widthwise dimension of the radius or less of the roller, and further each of the tapered surfaces is rounded at a location crossing with an extension of the race surface.

5. A turning bearing constructed as defined in claim 1, wherein the guide surfaces in the guide parts of the outer ring and the inner ring are tapered surfaces each of which inclines to make right angles relative to a rotating center of the roller and has a widthwise dimension extending across the rotating center of the roller over a length of the radius or less of the roller to prevent a skew of the roller.

6. A turning bearing constructed as defined in claim 1, wherein the one end of the axially opposite ends of the roller coming into sliding contact with the radially inward grooved race in the outer ring is guided while born against the guide surface at two contact locations diametrically opposite circumferential edges of the roller, and the other end of the roller coming into sliding contact with the radially outward grooved race of the inner ring is guided while born against the guide surface at a single contact location lying on the rotating center of the roller.

* * * * *